(12) United States Patent
Tomm

(10) Patent No.: US 7,798,755 B2
(45) Date of Patent: Sep. 21, 2010

(54) THREADED CONNECTOR WITH INTERLOCK

(76) Inventor: Erwin Tomm, 3320 W. 130th St., Cleveland, OH (US) 44111

(*) Notice: Subject to any disclaimer, the term of this patent is extended or adjusted under 35 U.S.C. 154(b) by 656 days.

(21) Appl. No.: 11/406,901

(22) Filed: Apr. 19, 2006

(65) Prior Publication Data
US 2006/0288509 A1    Dec. 28, 2006

Related U.S. Application Data

(60) Provisional application No. 60/673,090, filed on Apr. 20, 2005.

(51) Int. Cl.
*F16B 39/30* (2006.01)
*A46B 7/04* (2006.01)

(52) U.S. Cl. .................. 411/310; 16/422; 15/176.2
(58) Field of Classification Search ......... 411/305–306, 411/308–310, 426; 16/429, 422; 15/145, 15/146, 159, 176.2
See application file for complete search history.

(56) References Cited

U.S. PATENT DOCUMENTS

| | | | | |
|---|---|---|---|---|
| 341,145 | A * | 5/1886 | Howes | 411/307 |
| 1,764,876 | A | 6/1930 | Lauber | |
| 1,849,069 | A | 3/1931 | Bridges | |
| 1,980,093 | A * | 11/1934 | Rosenberg | 411/412 |
| 2,842,180 | A * | 7/1958 | Brown et al. | 411/285 |
| 3,426,642 | A | 2/1969 | Phipard, Jr. | |
| 3,661,046 | A * | 5/1972 | Waud et al. | 411/369 |
| 3,701,372 | A * | 10/1972 | Breed | 411/309 |
| 3,794,092 | A * | 2/1974 | Carlson et al. | 411/310 |
| 4,231,574 | A | 11/1980 | Williams | |
| 4,244,607 | A * | 1/1981 | Blose | 285/92 |
| 4,384,383 | A | 5/1983 | Bryant | |
| 4,541,139 | A | 9/1985 | Jones et al. | |
| 4,642,837 | A | 2/1987 | Nichols et al. | |
| 5,161,278 | A | 11/1992 | Tomm | |
| 5,502,862 | A * | 4/1996 | Vosbikian | 15/175 |
| 5,882,162 | A * | 3/1999 | Kaneko | 411/411 |
| 5,991,998 | A * | 11/1999 | Kaneko | 29/432.2 |
| 6,030,162 | A * | 2/2000 | Huebner | 411/413 |
| 6,219,883 | B1 * | 4/2001 | Keichline | 16/110.1 |
| 6,398,786 | B1 * | 6/2002 | Sesic | 606/308 |
| 6,658,689 | B2 * | 12/2003 | Vosbikian | 15/176.2 |
| 6,709,189 | B1 | 3/2004 | Spooner | |
| 7,549,195 | B2 * | 6/2009 | Bensussan et al. | 16/429 |

* cited by examiner

OTHER PUBLICATIONS

International Search Report for PCT/US2006/14645.

*Primary Examiner*—Flemming Saether
(74) *Attorney, Agent, or Firm*—Fay Sharpe LLP

(57) ABSTRACT

A threaded connector includes a base and a threaded male portion projecting axially outward from the base. The threaded male portion is adapted to mate with an associated threaded female socket. The threaded male portion includes a helical thread comprising three sections: (i) a lead-in section; (ii) a transitional cam-locking section; and, (iii) a friction-locking section. The friction-locking section is located adjacent the base, the lead-in section is spaced from the base, and the transitional cam-locking section connects the lead-in section to the friction-locking section. The helical thread includes a tip and a root. The lead-in section is defined by a first major diameter at the tip of said thread and the friction-locking section is defined by a second major diameter at the tip of the thread. The second major diameter is greater than the first major diameter. The transitional cam-locking section includes a locking cam defined by a varying magnitude major diameter at the tip of the thread that increases from the first major diameter to the second major diameter in a smooth, continuous transition without interrupting the helical thread.

3 Claims, 3 Drawing Sheets

THREADED CONNECTOR WITH INTERLOCK

CROSS-REFERENCE TO RELATED APPLICATION

This application claims priority from and benefit of the filing date of U.S. provisional application Ser. No. 60/673,090, filed Apr. 20, 2005. The disclosure of U.S. provisional application Ser. No. 60/673,090, filed Apr. 20, 2005 is also hereby expressly incorporated by reference.

BACKGROUND

Many cleaning tools such as push-brooms, mop holders, window cleaning implements, etc. are adapted to be threaded to the distal end of a handle or pole. Typically, the threaded connection is made by way of an ACME ¾-5 thread system, i.e., an ACME thread having a ¾ inch outside or major diameter axially spaced at 5 threads per inch. Typically the thread depth is deeper than a standard thread to aid in forming the thread in wooden handles. The mating female threads are defined in a socket that is connected to or formed as part of the cleaning tool. Conventional thread systems for connecting cleaning tools to a handle/pole have been found to be susceptible to loosening when the cleaning implement is bumped or otherwise caused to rotate in the counter-clockwise direction. This is a result of the coarseness of the threads, as well as the lack of sufficient frictional engagement of the male/female threads. Prior attempts to prevent unintended loosening of the threads have included defining the mouth of the female socket and the base of the male component to have mating conical faces, often with serrations or the like defined in these faces to increase friction. Such arrangement has not been found to be satisfactory in preventing unintended loosening of the components. Other arrangements are more complex and rely on use of locking collars and the like that are economically uncompetitive for many applications.

SUMMARY

In accordance with a first aspect of the present development, a threaded connector includes a base and a threaded male portion projecting axially outward from the base. The threaded male portion is adapted to mate with an associated threaded female socket. The threaded male portion includes a helical thread comprising three sections: (i) a lead-in section; (ii) a transitional cam-locking section; and, (iii) a friction-locking section. The friction-locking section is located adjacent the base, the lead-in section is spaced from the base, and the transitional cam-locking section connects the lead-in section to the friction-locking section. The helical thread includes a tip and a root. The lead-in section is defined by a first major diameter at the tip of said thread and the friction-locking section is defined by a second major diameter at the tip of the thread. The second major diameter is greater than the first major diameter. The transitional cam-locking section includes a locking cam defined by a varying magnitude major diameter at the tip of the thread that increases from the first major diameter to the second major diameter in a smooth, continuous transition without interrupting the helical thread.

In accordance with another aspect of the present development, a threaded connector arrangement includes a male connector and a female threaded socket. The male connector includes: a base; a threaded male portion projecting axially outward from the base, the threaded male portion including a first helical thread comprising three sections: (i) a lead-in section; (ii) a transitional cam-locking section; and, (iii) a friction-locking section. The friction-locking section is located adjacent the base, the lead-in section is spaced from the base, and the transitional cam-locking section connects the lead-in section to the friction-locking section. The first helical thread includes a tip and a root, wherein the lead-in section is defined by a first major diameter at the tip of the thread and the friction-locking section is defined by a second major diameter at the tip of the thread that is greater than the first major diameter. The transitional cam-locking section includes a locking cam defined by a varying magnitude major diameter at the tip of the thread that increases from the first major diameter to the second major diameter. The threaded male portion is mated with the female threaded socket. The socket comprises a second helical thread having a tip and a root. The tip and root of the first helical thread of the friction-locking section are frictionally engaged with the root and tip of the second helical thread of the socket, respectively.

BRIEF DESCRIPTION OF THE DRAWINGS

FIG. 3C1 is a first sectional view as taken along line C-C of FIG. 1, focused on the minor diameter of the threaded connector;

FIG. 3C2 is a second sectional view as taken along line C-C of FIG. 1, focused on the major diameter of the threaded connector;

DETAILED DESCRIPTION

Figure 1:
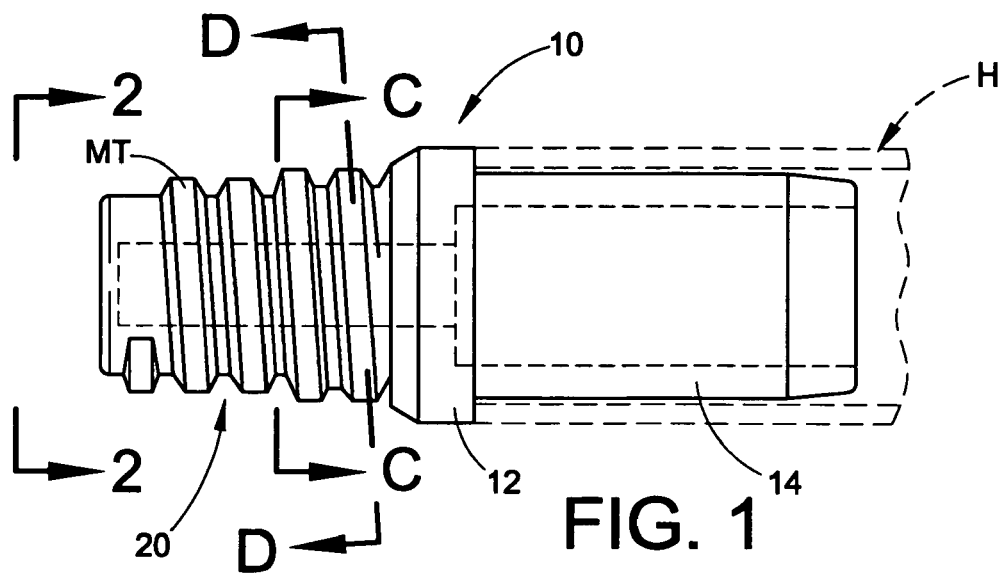
FIG. 1 is a side view of a threaded connector formed in accordance with the present development (an associated handle is shown in broken lines)
Figure 2:
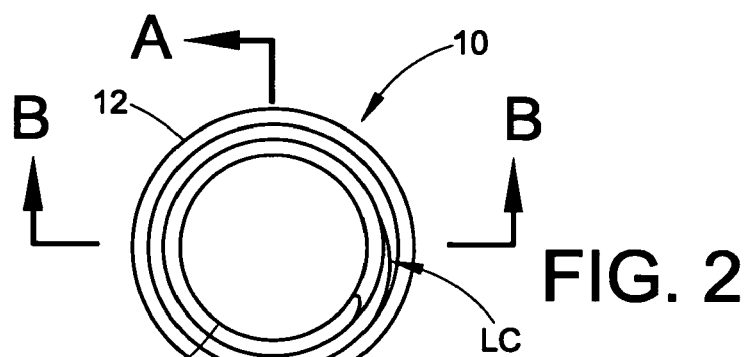
FIG. 2 is a front view of the threaded connector as taken along view line 2-2 of FIG. 1.

FIGS. 1 and 2 show a threaded connector 10 formed in accordance with the present development. In the illustrated embodiment, the threaded connector 10 is shown as a one-piece molded polymeric or "plastic" part that is defined as part of or, as shown, connected to an associated handle H, such as a push-broom handle, telescoping handle, etc. In one alternative embodiment, the threaded connector 10 is defined as part of the handle H, e.g., carved/cut/molded in the distal end of a wooden or polymeric handle.

The threaded connector 10 comprises a base 12. A mounting stud 14 projects outwardly from the base 12 in a first (inward) direction and is adapted to be inserted into the hollow inner diameter of the handle H. Alternatively, the mounting stud 14 is defined as a female socket adapted to be received over the handle H and secured thereto.

Figure 3D:
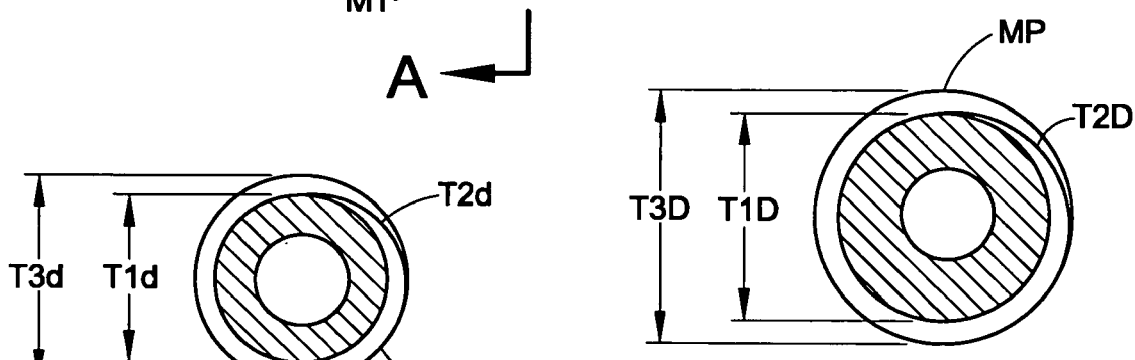
FIG. 3D is a sectional view as taken along line D-D of FIG. 1.
Figure 3D:
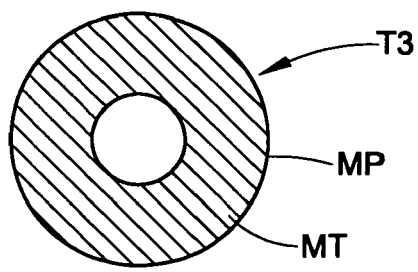

A threaded male portion 20 projects axially outward from the base 12 in a direction opposite the mounting stud 14. The threaded male portion 20 is adapted to mate in a threaded fashion with a conventional threaded female socket S as shown in FIG. 3B. The female socket S is typically an ACME ¾-5 threaded socket, defined with a thread ST spaced at 5 threads per axial inch. The female socket S is defined in a member or device that is adapted to be connected to the handle H using the threaded connector 10. As shown, the female socket S is defined in a cleaning implement I such as a wooden or polymeric broom head, but the female socket S can alternatively by defined in or connected to a molded polymeric or metal connector or the like. The female socket S defines a major diameter SD at the root SR of the thread ST (i.e., a root-to-root diameter) and a minor diameter sd at the tip SP of the thread ST (i.e., a tip-to-tip diameter).

Figure 3A:
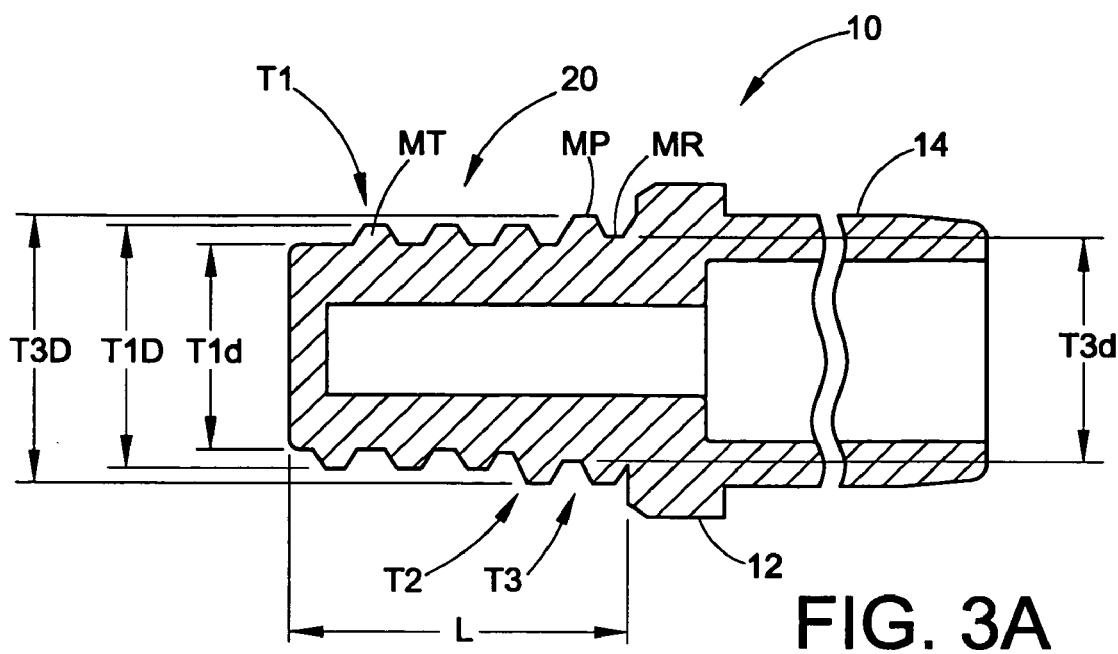
FIG. 3A is an enlarged sectional view as taken along line A-A of FIG. 2.
Figure 3B:
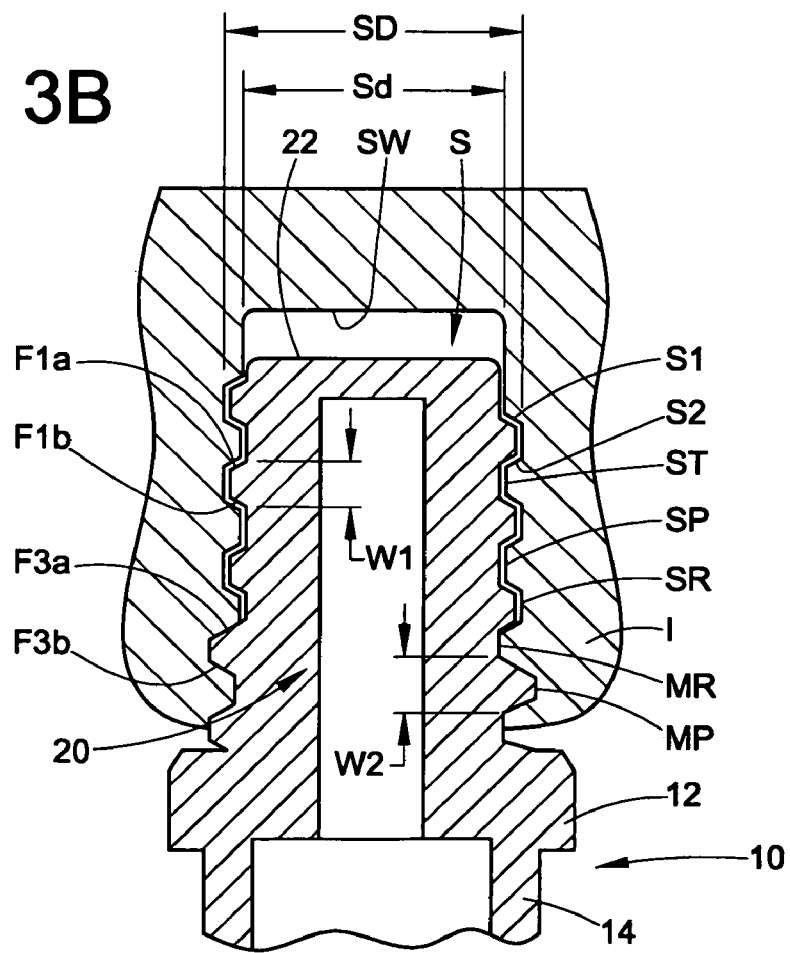
FIG. 3B is an enlarged sectional view as taken along line B-B of FIG. 2 and showing the threaded connector mated with a conventional ¾-5 female threaded socket of a broom or other implement.
Figure 4:
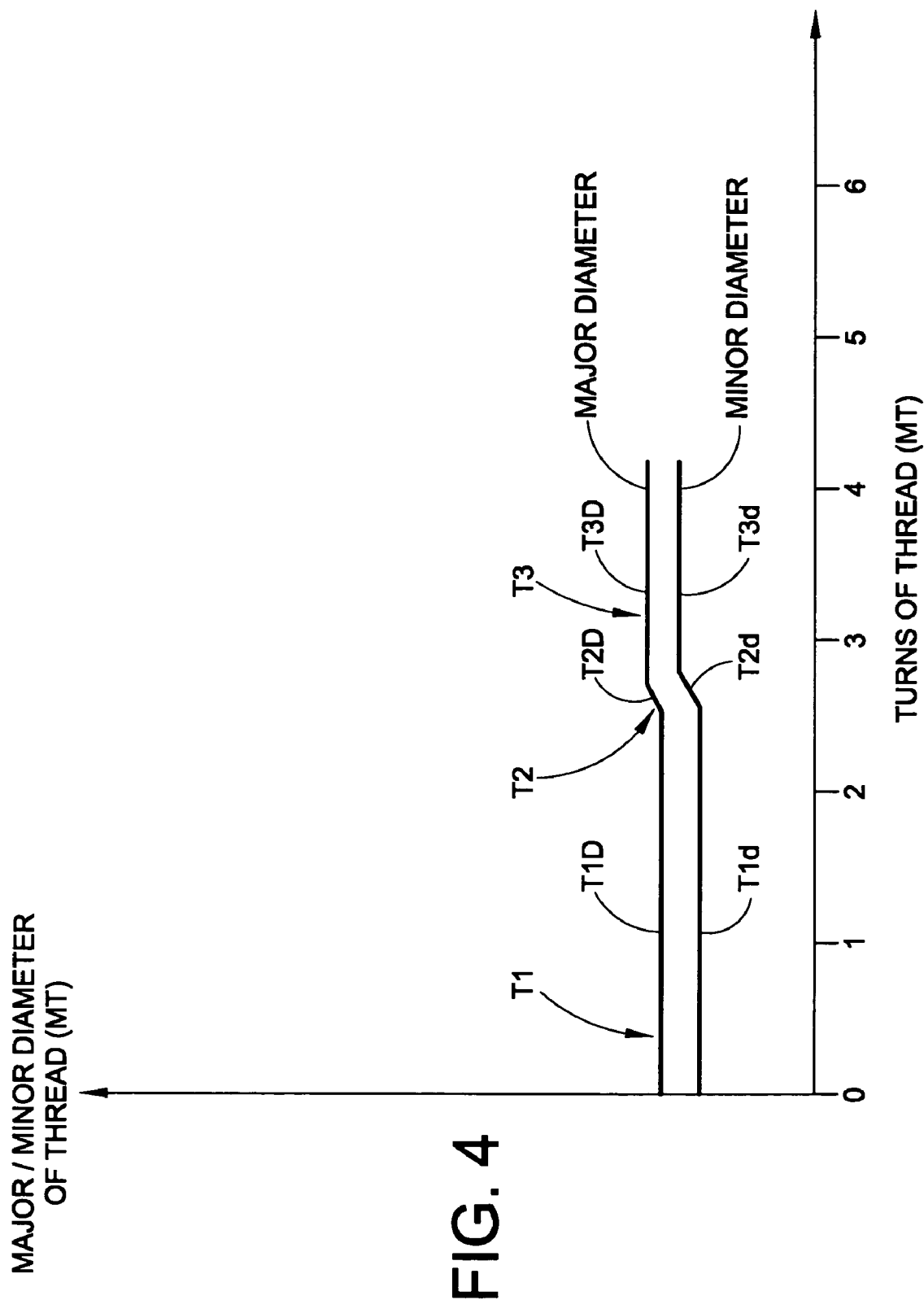
FIG. 4 is a graph that plots the major diameter and the minor diameter of the threaded connector of FIG. 1.

FIG. 3A is a greatly enlarged sectional view of the threaded connector 10. There, it can be seen that the threaded male portion 20 comprises a single, continuous helical thread MT defined by three main axial sections: (i) a lead-in section T1; (ii) a transitional cam-locking section T2; and, (iii) a friction-locking section T3. The cam-locking section T2 is located between and interconnects the lead-in section T1 to the friction-locking section T3. More particularly, the friction-locking section T3 is connected to and projects axially outward from the base 12. The lead-in section T1 is located axially outward from the friction-locking section T3 and is connected to the friction-locking section by the cam-locking section T2. Although it is not intended to limit the scope of the invention in any way, it is noted that the male portion 20, as defined by the lead-in section T1, cam-locking section T2 and friction-locking section T3, defines an overall axial length L of 1 inch or more projecting from base 12, which is preferably slightly less than the depth of the socket S so that, as shown in FIG. 3B, the distal end 22 of the male portion does not bottom-out in the socket when the male portion 20 is fully inserted into the socket S.

The lead-in section T1 is defined by about 2.5 to 3 (e.g., 2.75) turns of the thread MT having a major (measured from tip-to-tip of the thread as shown) diameter T1D of 0.718 inches and a minor diameter (measured from root-to-root of the thread as shown) T1d of 0.597 inches, which results in a thread depth of about 0.06 inches. The lead-in section T1 thus easily and loosely mates with the standard ACME ¾-5 socket S as shown in FIG. 3B. In FIG. 3B, it can be seen that the major and minor diameters T1D,T1d of the lead-in section T1 are not firmly frictionally engaged with the major diameter SD or minor diameter sd of the socket thread ST. Also, the opposite side flanks F1a,F1b of the thread MT in the lead-in section T1 are dimensioned so as not to be frictionally engaged with the corresponding side flanks S1,S2 of the socket thread ST. The lead-in section T1 is intended to provide an easy and low-friction start to the threaded mating interconnection of the male connector 10 into the female socket S. The major and minor diameters T1D,T1d of the lead-in section T1 are preferably constant. In the illustrated embodiment, the lead-in thread section T1 is a conventional industry standard thread designed to mate with an ACME ¾-5 female socket thread ST.

The friction-locking section T3 is defined by about 1 to 1.25 turns of the thread MT having a major diameter T3D of 0.835 inches and a minor diameter T3d of 0.669 inches, and these dimensions are greater than the major and minor diameters SD,sd of the socket S. The friction-locking section T3 thus has a thread depth of 0.083 inches. Owing to the increased major and minor diameters T3D,T3d, the tip MP of the male thread MT in the friction-locking section T3 frictionally engages the root SR (see FIG. 3B) of the socket thread ST, and the tip SP of the socket thread ST frictionally engages the root MR of the male thread MT in the friction-locking section T3. This ensures that the friction-locking section T3 firmly and frictionally mates with the standard ACME ¾-5 socket S as shown in FIG. 3B. In FIG. 3B, it can also be seen that the male thread MT in the friction-locking section T3 is conformed and dimensioned so that the opposite side flanks F3a,F3b are frictionally engaged with the corresponding side flanks S1,S2 of the socket thread ST. This is due to the fact that the male thread MT is made wider, as measured at the root MR and at other locations between the root MR and tip MP, e.g., compare the width W1 with the width W2 in FIG. 3B. Those of ordinary skill in the art will recognize that the friction-locking section T3 is tightly frictionally engaged with the female socket S at four separate interfaces, i.e., at the major and minor diameters T3D,T3d of the male thread MT and at the opposite side flanks F3a,F3b. This tight frictional engagement of the friction-locking section T3 of the male connector 10 in socket S necessitates that the number of turns of the male thread MT that defines the friction-locking section T3 be limited to ensure that the male portion 20 of the connector 10 is able to be fully engaged with the socket S, to ensure that the connector 10 can be manually disengaged from the socket S when desired, and to prevent damage to the socket S. The major and minor diameters T3D,T3d are preferably also constant in the friction-locking section T3.

The transitional cam-locking section T2 of the male connector portion 20 is defined by the male thread MT located axially between and interconnecting the lead-in section T1 and the friction-locking section T3 in a smooth, uninterrupted fashion. Because the thread MT is continuous and uninterrupted, the major and minor diameters T1D,T1d of the lead-in section T1 must respectively increase to the dimensions of the major and minor diameters T3D,T3d of the friction-locking section T3. This is accomplished in the transitional cam-locking section T2, which is preferably completely encompassed in a 0.25-0.5 turn or 90 degree to 180 degree angular section of the male thread MT. Specifically, in the transition cam-locking section T2, the major and minor diameters T1D, T1d of the lead-in section T1 are smoothly increased to the major and minor diameters T3D,T3d of the friction-locking section T3, respectively. As such, the cam-locking section T2 defines a ramp-like locking cam LC (FIGS. 2, 3C1 and 3C2) where the tip MP and root MR of the male thread MT change diameter to smoothly blend the major and minor diameters T1D,T1d of lead-in section T1 into the major and minor diameters T3D,T3d of the friction-locking section T3. FIG. 3C1 shows the change from the minor diameter T1d to the minor diameter T3d by a minor transitional thread portion T2d of the cam-locking section T2. FIG. 3C2 shows the change from the major diameter T1D to the major diameter T3D by a major transitional thread portion T2D of the cam-locking section T2 (the views of FIGS. 3C1 and 3C2 are simplified and don't show surrounding structure to facilitate an understanding of the present development). The minor and major transitional thread portions T2d,T2D together define the locking cam LC, although it is contemplated that the locking cam LC be defined by only the major transitional thread portion T2D. Also, the minor transitional thread T2d can define a step rather than a smooth curve between the minor diameter T1d and minor diameter T3d. The locking cam LC, adjacent the friction-locking section T3, is sufficiently large in diameter so as to frictionally engage the socket major and minor diameters SD,sd, without any significant frictional engagement of the thread flanks in the transition section T2 with the flanks S1,S2 of the socket thread ST. The smooth, continuously curved shape of the major transitional portion T2D of the cam-locking section is important so that when the male portion 20 is threaded into a female socket S, the friction-locking section is gradually engaged with the socket S instead of being suddenly engaged with the socket as could cause a sudden increase in stress that could damage the socket and/or the male portion 20, i.e., the smooth, continuously curved shape of the major transitional portion T2D allows the frictional engagement to build gradually to minimize the chance for such damage.

In use, to engage the connector 10 with the socket S, the lead-in section T1 of the male threaded portion 20 is threaded into the socket S. Continued threaded advancement of the male portion 20 into the socket S causes the locking cam LC of the transitional cam-locking portion T2 of the male thread MT to come into engagement with the socket thread ST, at which time the tip MP of the male thread MT begins to frictionally engage the root SR of the socket thread ST and the tip SP of the socket thread ST begins to frictionally engage the root MR of the male thread MT. Further threaded advancement of the male portion 20 into the socket S causes the friction-locking section T3 to move into engagement with the socket thread ST, with its above-described four-way frictional engagement, which results in a tight frictional locking of the male and female threads MT,ST which prevents inadvertent disengagement. As noted and as shown in FIG. 3B, it is preferred that the male portion 20 not bottom-out in the socket S before the base 12 of connector 10 abuts implement I in which socket S is defined, i.e., when the male portion 20 is fully threaded into the socket S and the cam-locking section T2 and friction-locking section T3 are fully frictionally engaged with the socket thread ST, a space remains between the tip 22 of the male portion 20 and the innermost transverse wall SW of the socket S.

The development has been described with reference to preferred embodiments. Modifications and alterations will be apparent to those of ordinary skill in the art after reading this specification, and it is intended that the claims be construed to the fullest possible extent to encompass all such modifications and alterations.

The invention claimed is:

1. A threaded connector comprising:

a molded polymeric base;

a molded polymeric threaded male portion defined as a one-piece construction with said base and projecting axially outward from the base and adapted to mate with an associated threaded female socket, said threaded male portion comprising a helical thread comprising three sections: (i) a lead-in section; (ii) a transitional cam-locking section; and, (iii) a friction-locking section;

wherein the friction-locking section is located adjacent the base, said lead-in section is spaced from the base, and said transitional cam-locking section connects the lead-in section to the friction-locking section;

said helical thread comprising a tip and a root;

wherein said lead-in section is defined by a first major diameter at said tip of said thread and said friction-locking section is defined by a second major diameter at said tip of said thread that is greater than said first major diameter, and wherein said transitional cam-locking section comprises a locking cam defined by a varying magnitude major diameter at said tip of said thread that increases from said first major diameter to said second major diameter in a smooth, continuous transition without interrupting said helical thread;

wherein said helical thread further comprises side flanks between said root and tip, and wherein said side flanks define said thread to have a width, said thread having a greater width in said friction-locking section as compared to said lead-in section; and, wherein said lead-in section is defined by between 2.5 and 3 turns of said thread and said friction-locking section is defined by between 1 and 1.25 turns of said thread, and said transitional cam-locking section is defined by less than 0.5 turns of said thread.

2. A threaded connector comprising:

a molded polymeric base;

a molded polymeric threaded male portion defined as a one-piece construction with said base and projecting axially outward from the base and adapted to mate with an associated threaded female socket, said threaded male portion comprising a helical thread comprising three sections: (i) a lead-in section; (ii) a transitional cam-locking section; and, (iii) a friction-locking section;

wherein the friction-locking section is located adjacent the base, said lead-in section is spaced from the base, and said transitional cam-locking section connects the lead-in section to the friction-locking section;

said helical thread comprising a tip and a root;

wherein said lead-in section is defined by a first major diameter at said tip of said thread and said friction-locking section is defined by a second major diameter at said tip of said thread that is greater than said first major diameter, and wherein said transitional cam-locking section comprises a locking cam defined by a varying magnitude major diameter at said tip of said thread that increases from said first major diameter to said second major diameter in a smooth, continuous transition without interrupting said helical thread;

wherein said helical thread further comprises side flanks between said root and tip, and wherein said side flanks define said thread to have a width, said thread having a greater width in said friction-locking section as compared to said lead-in section; and, wherein said male portion is mated with a female ¾ inch-5 threads per inch threaded socket, wherein said socket comprises a ¾ inch-5 threads per inch helical thread having a tip and a root, wherein said tip and root of said helical thread of said friction-locking section of said threaded male portion are frictionally engaged with said root and tip of said helical thread of said socket, respectively.

3. The threaded connector as set forth in claim 2, wherein said helical thread of said socket further includes side flanks, and wherein said side flanks of said helical thread of said friction-locking section of said threaded male portion are frictionally engaged with said side flanks of said helical thread of said socket.

* * * * *